United States Patent
Fu et al.

(10) Patent No.: US 6,895,242 B2
(45) Date of Patent: May 17, 2005

(54) SPEECH ENABLED WIRELESS DEVICE MANAGEMENT AND AN ACCESS PLATFORM AND RELATED CONTROL METHODS THEREOF

(75) Inventors: Rongyao Fu, Beijing (CN); Jun Shen, Beijing (CN); Song Song, Beijing (CN); Wei Li, Beijing (CN)

(73) Assignee: International Business Machines Corporation, Armonk, NY (US)

(*) Notice: Subject to any disclaimer, the term of this patent is extended or adjusted under 35 U.S.C. 154(b) by 537 days.

(21) Appl. No.: 09/969,867

(22) Filed: Oct. 3, 2001

(65) Prior Publication Data

US 2002/0077095 A1 Jun. 20, 2002

(30) Foreign Application Priority Data

Oct. 13, 2000 (CN) .................................. 00 1 30478

(51) Int. Cl.[7] .............................. H04Q 7/20; H04N 7/00
(52) U.S. Cl. ...................... 455/420; 455/420; 704/275; 704/270; 704/270.1; 364/188
(58) Field of Search .................. 455/420, 79, 410, 455/411, 414, 418, 419, 563, 569.1, 569.2; 704/275, 246, 270, 270.1; 367/825

(56) References Cited

U.S. PATENT DOCUMENTS

| | | | |
|---|---|---|---|
| 5,774,859 A | * | 6/1998 | Houser et al. ............... 704/275 |
| 5,903,454 A | | 5/1999 | Hoffberg et al. |
| 5,974,413 A | | 10/1999 | Beauregard et al. |
| 6,081,750 A | | 6/2000 | Hoffberg et al. |
| 6,408,272 B1 | * | 6/2002 | White et al. ............... 704/270.1 |
| 6,606,280 B1 | * | 8/2003 | Knittel ......................... 367/198 |
| 6,718,307 B1 | * | 4/2004 | Buil et al. ................... 704/270 |

* cited by examiner

Primary Examiner—David Hudspeth
Assistant Examiner—Julio Perez
(74) Attorney, Agent, or Firm—Ido Tuchman; Thu Ann Dang

(57) ABSTRACT

A speech-enabled device management and access platform includes a communication module which provides a remote control device and a controlled device with data/speech paths; a connection management module which maintains the communication network and provides security administration and device access control; a device management module which discovers a controlled device and gathers respective controlled device data; a speech processing module which converts a speech command into a data command corresponding to the controlled device or converts a data response from the controlled device into a speech response and provides it to the communication module; and a command/event management module which generates instructions based on the data command and sends the instructions to corresponding modules or the controlled device. The inventive device management and access platform preferably is adapted to use the well-known BLUETOOTH™ wireless technology.

15 Claims, 3 Drawing Sheets

SPEECH ENABLED WIRELESS DEVICE MANAGEMENT AND AN ACCESS PLATFORM AND RELATED CONTROL METHODS THEREOF

BACKGROUND OF THE INVENTION

1. Field of the Invention

The invention relates to wireless communication technology, and particularly, to a device and a method for performing management and control for a wireless device by using speech.

2. Brief Description of the Prior Art

With the rapid development of pervasive computing, in people's daily life and work there appear various pervasive computing devices, which reduce people's labor and provide new functions. However, this development tends also to bring many problems. For example, different devices may adopt different access and control methods. When new devices appear continually, people have to learn how to operate these devices and how to use the remote controllers of these devices. When the number of devices increases, people will face various control panels or remote controllers and do not know what to do. In addition, sometimes people are required to operate many devices simultaneously, and at this time it is very possible to cause confusion or erroneous operation.

Therefore, most people, particularly disabled persons, wish to control all devices in certain environments in a unified manner by a single control device (such as a kind of remote controller). In addition, people also wish to be capable of controlling various devices anytime and anywhere.

However, in accordance with the methods of the prior art, the requirements described above will increase the complexities of the controlling devices and the controlled devices and reduce their price performance ratio.

In the prior art, there is BLUETOOTH™ wireless technology. BLUETOOTH™ is a wireless technology standard proposed by Erisson, IBM, Intel, Nokia and Toshiba as an original organization in May 1998. In as short as two years since then, over 1800 companies have participated the Special Interested Group (SIG) of the BLUETOOTH™ technology. Those of skill in the wireless communications art are familiar with BLUETOOTH™ wireless technology. Complete information is available on the www sites, under the BLUETOOTH™ name, in both the .com and .org domains. BLUETOOTH™ is a trademark and service mark of Telfonaktiebolaget LM Ericsson Corporation of Stockholm, Sweden.

In particular, BLUETOOTH™ technology is a short distance wireless communication technology which runs using the 2.4 GHz ISM (industrial scientific medical) band. The short distance means that the effective communication distance is about 10–100 meters between BLUETOOTH™ devices, i.e. the effective communication distance is about 10 meters when the maximum transmitting power is 1 mW (0 dBm) and the effective communication distance is about 100 meters when the maximum transmitting power is 100 mW (20 dBm). The basic network structure is a piconet constituted by one master device and at most seven slave devices, and several piconets can constitute a bigger scatternet. BLUETOOTH™ technology uses a time division multiple access (TDMA) scheme, and supports at least one asynchronous data path and at most three synchronous data paths. In summary, by using BLUETOOTH™ technology, various devices can be connected in a wireless manner at low cost, and wireless channels are established between them so as to perform speech communication and data communication.

Furthermore, the natural speech processing technology in the prior art has been capable of recognizing speech as text or transforming text into speech, and thus provides people a simple man-machine interface which controls devices by means of speech.

SUMMARY OF THE INVENTION

A main object of the invention is to provide a speech enabled BLUETOOTH™ device management and access platform, hereinafter referred to as simple SBP, by combining BLUETOOTH™ technology with the natural speech processing technology.

Another object of the invention is to provide a method for performing management and control for all BLUETOOTH™ devices in certain environments by a unified speech operation manner.

For realizing the purposes described above, the invention provides a speech enabled BLUETOOTH™ device management and access platform, including:

a BLUETOOTH™ communication module, for establishing radio frequency connections with a remote control device and with a controlled device, and providing data and speech paths, for example, receiving speech commands from the remote control device;

a connection management module, for maintaining network topology based on BLUETOOTH™ communication modules, and providing network security administration and device access control;

a device management module, for discovering a controlled device located in the radio frequency proximity of said platform, and gathering related controlled device data from the discovered controlled device, as well as providing an interface for performing personalizing configuration, for example, naming the device;

a speech processing module, for converting a speech command received by said BLUETOOTH™ communication module into a data command corresponding to the controlled device data gathered by said device management module, or converting a data response from the controlled device into a speech response and providing the speech response to the BLUETOOTH™ communication module; and a command/event management module, for generating corresponding instructions based on the data command from said speech processing module, and sending the generated instructions to corresponding modules or the controlled device.

The invention also provides a method of managing and controlling a BLUETOOTH™ device with speech, including the steps of:

establishing radio frequency connections with a remote control device and receiving a speech command from the remote control device;

converting the received speech command into a data command for a respective controlled device;

generating corresponding instructions based on said data command, and sending the generated instructions to the related controlled device.

With the speech enabled BLUETOOTH™ device management and access platform of the invention, the user, at anytime and at anywhere, can perform control and access to all devices in a certain range in a unified speech operation manner, without increasing the complexity of the control device and the controlled device. This will greatly facilitate people's daily life and work.

In particular, the invention has the following advantages:

(1) Since a wireless network is set between a control device and a controlled device, the device connection is simplified.

(2) People need not perform control for the various BLUETOOTH™ devices in certain range with their hands but rather with natural language to improve work efficiency greatly.

(3) People can operate all devices with unified natural language without being required to know the particular operation sequence of the particular device.

(4) People, at anytime and at anywhere, can perform control and access to all BLUETOOTH™ devices located in the radio frequency range of the control device, which facilitates disabled persons particularly.

(5) The costs of the control device and controlled device are not increased significantly. Almost all functions are completed by the platform provided by the invention.

BRIEF DESCRIPTION OF THE DRAWINGS

The above described and other characteristics and advantages will be more apparent after making a description of the invention in conjunction with the accompanying drawings, in which.

The description of the preferred manners of the embodiments of the invention is made in conjunction with the accompanying drawings.

DETAILED DESCRIPTION OF THE INVENTION

Figure 1:
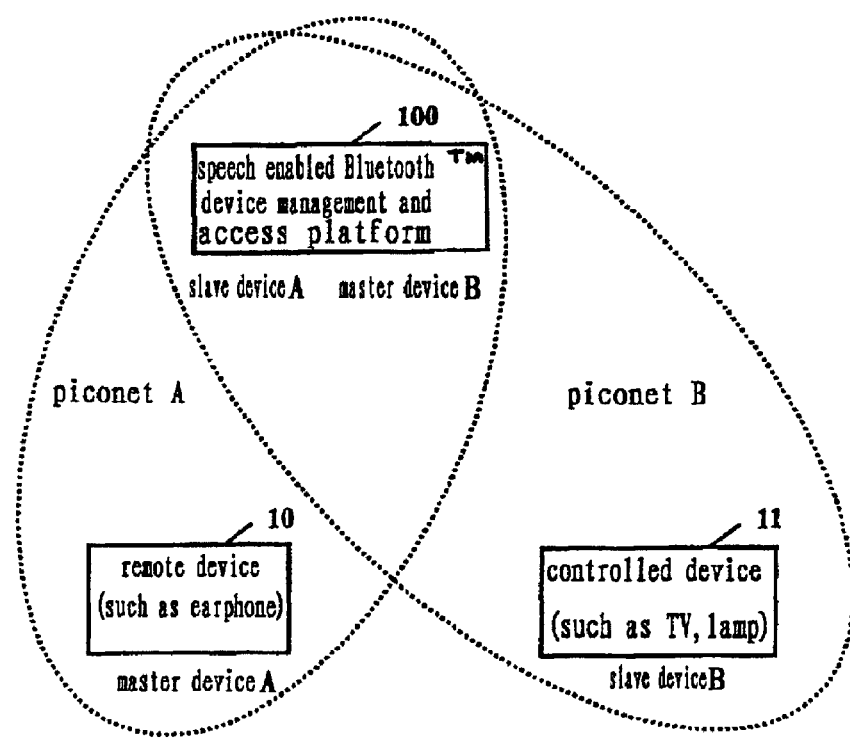
FIG. 1 shows a basic application manner of a speech enabled BLUETOOTH™ device management and access platform (SBP) of the invention.

FIG. 1 shows a basic application manner of a speech enabled BLUETOOTH™ device management and access platform (SBP) of the invention. Reference number 100 indicates SBP of the invention. Reference number 10 indicates a remote device such as an earphone. Reference number 11 indicates a controlled device such as TV, a lamp etc.

The remote device 10 is used as a user interface device and it at least has a speech input capacity. The remote device 10 receives a user's speech command and transmits it to SBP 100. Furthermore, the remote device 10 can also have a speech output capacity, can receive a speech response from SBP 100, and can broadcast the response to the user.

The controlled device 11 can be any object which has a BLUETOOTH™ communication capacity, as long as this object is capable of providing some information, executing some actions or managing some resources according to external data commands. The controlled device 11 receives data commands from SBP 100, executes predetermined actions, and returns the corresponding responses to SBP 100. Furthermore, if necessary, the controlled device 11 can also report some events to SBP 100 actively.

SBP 100 functions as a bridge between the remote device 10 and the controlled device 11. In particular, SBP 100 receives the speech command transmitted by the remote device 10, converts the received speech command into a format which can be recognized by the controlled device 11 with a speech recognition engine (contained in a speech processing module 4 in FIG. 2), and then sends the command to the controlled device 11. Furthermore, SBP 100 can also receive the returned device response from the controlled device 11, and by means of a text-speech converting engine (contained in the speech processing module 4 in FIG. 2), can convert the received response into a speech format to be transmitted to the remote device 10.

As shown in FIG. 1, for reducing the complexity of the device so as to lower its cost, both the communication between the remote device 10 and SBP 100, and the communication between SBP 100 and the controlled device 11, are realized with a piconet in BLUETOOTH™. For this reason, the remote device 10, the controlled device 11, and SBP 100 are provided with respective BLUETOOTH™ communication modules.

The remote device 10 and SBP 100 constitute a piconet A, in which the remote device 10 is used as a master device (for example, referred to as a master device A) in the piconet A and SBP 100 as a slave device (for example, refered to as a slave device A) in the piconet A. All the connections and data transmissions in the piconet A are started and stopped by the remote device 10 (i.e. the master device A).

SBP 100 and the controlled device 11 constitute a piconet B, in which SBP 100 is used as a master device (for example, refered to as a master device B) in the piconet B and the controlled device 11 as a slave device (for example, refereed to as a slave device B) in the piconet B. All the connections and data transmissions in the piconet B are started and stopped by SBP 100 (i.e. the master device B).

The piconet A and the piconet B constitute a scatternet through SBP 100. For the detailed illustration related to the piconet and the scatternet, refer to the BLUETOOTH™ specifications, the detailed description of which is omitted here. As noted above, the relevant BLUETOOTH™ wireless standards and specifications are publicly available and such materials are well-known to these skilled in the wireless communications art.

Figure 2:
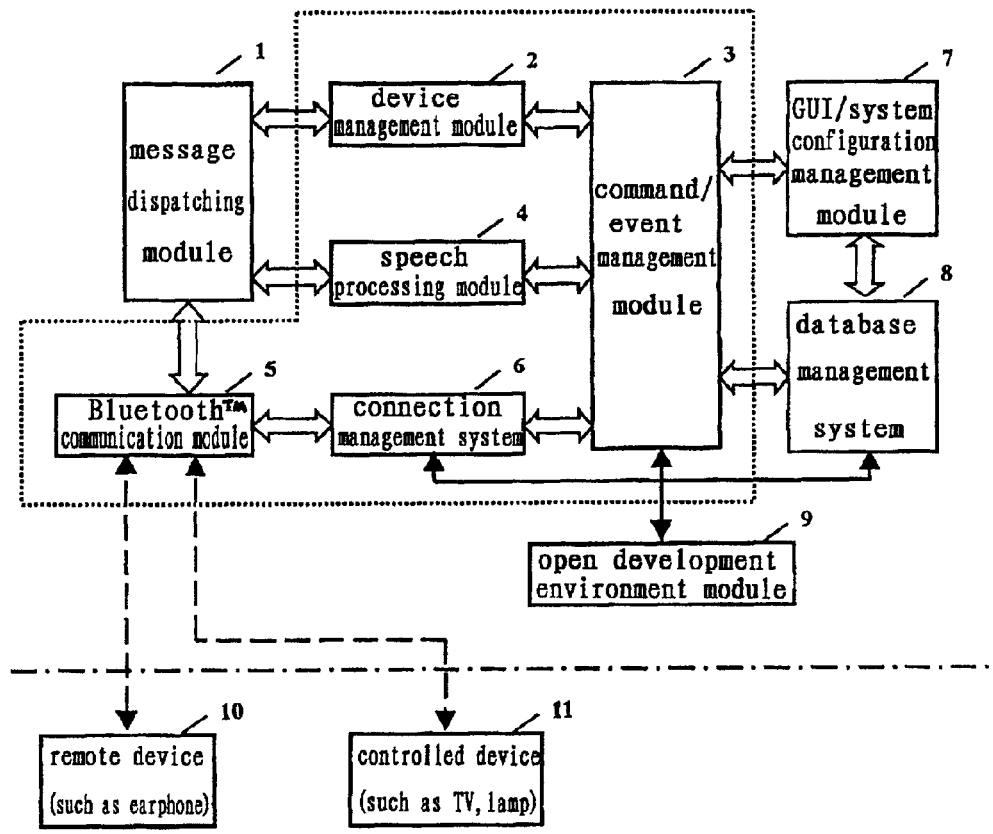
FIG. 2 shows a basic logic structure of SBP of the invention in detail.

The portion above the dot-dash line in FIG. 2 shows a basic logic structure of the SBP 100 of FIG. 1. Reference number 1 indicates a message dispatching module. Reference number 2 indicates a device management module. Reference number 3 indicates a command/event management module. Reference number 4 indicates a speech processing module. Reference number 5 indicates a BLUETOOTH™ communication module. Reference number 6 indicates a connection management module. Reference number 7 indicates a GUI/system configuration management module. Reference number 8 indicates a database management system. Reference number 9 indicates an open development environment module. Reference number 10 indicates a remote device. Reference number 11 indicates a controlled device.

The BLUETOOTH™ communication module 5 is used for providing radio frequency connections between SBP 100 and the remote control device 10 and radio frequency connections between SBP 100 and the controlled device 11.

The communication between the BLUETOOTH™ communication module 5 and the remote control device 10 and the communication between the BLUETOOTH™ communication module 5 and the controlled device 11 are schematically shown in FIG. 2 by a dash line arrow. These communications are realized with the piconet of BLUETOOTH™ technology, and have been described above in conjunction with FIG. 1.

The connection management module 6 is used for providing a reliable and secure point to point connection and maintaining the whole network topology based on BLUETOOTH™ communication modules. Furthermore, the connection management module 6 also generates and manages a key for the whole system. The key can be used for encrypting the data transmission.

The message dispatching module 1, in accordance with the message resource, transmits messages or events between related modules within the SBP 100. In other words, the message dispatching module 1 is used for establishing a network connection of the messages or events within a platform.

For example, after the BLUETOOTH™ communication module 5 receives a speech command from the remote device 10, the message dispatching module 1 transmits such speech command from the BLUETOOTH™ communication module 5 to the speech processing module 4 as a message.

It should be realized that the message dispatching module 1 is optional, because the respective other modules can be designed to transmit messages to related modules without providing a separate message dispatching module 1.

The speech processing module 4, after receiving a speech command, first converts it into text. Then, the text format command is analyzed and interpreted into a series of predetermined format data commands. These data commands are transmitted by the message dispatching module 1 to the command/event management module 3 to be processed further. As described hereafter, the command/event management module 3 controls itself according to these data commands, or controls the corresponding controlled device 11 to execute certain actions. By means of the cooperation of the speech processing module 4 and other respective modules, the user can control the device which is remote and can not be directly controlled by speech, with oral commands and by using a controller without speech processing function.

In contrast, if a data response from the controlled device 11 is received by the speech processing module 4, it will interpret the data response, and transmit the interpreted result to the control device 10 through the BLUETOOTH™ communication module 5.

The device management module 2 is used for automatically discovering various devices and services, in accord with the BLUETOOTH™ specification, within radio frequency range. All the collected information will be transmitted to the database management system 8 so as to be maintained and stored. Another task of the device management module 2 is to provide a tool which sets personally the BLUETOOTH™ devices. That is, with the device management module 2, the user, according to his/her own preference, can set a unique identifier for every device. Therefore, the user can organize all the devices according to the convenience of his/her actual life or work style.

The personalizing setting described above is important to the speech processing. For example, the user can control the lamp located in the bedroom with oral commands "turning on" or "turning on the lamp located in the bedroom". However, the lamp can not provide on its own the additional information such as "located in the bedroom". Therefore, these kinds of problems can be solved by the device management module 2.

The command/event management module 3, as a core of SBP 100, receives messages or events from other modules in the platform, and manages all the actions of SBP 100 based on the received message or events. The inputs of the command/event management module 3 may be the data commands from the speech processing module 4, the events from any other modules, the responses from the controlled device 11, etc.

The database management system 8 provides support for storing, maintaining and accessing batch data. During operation, SBP 100 will produce a quantity of different databases, such as the device information database, the system recording database, the user configuration database, etc. All the databases can be accessed by many modules in the platform simultaneously.

The GUI/system configuration management module 7 provides the user with a graphic interface for operation of SBP 100. With the GUI/system configuration management module 7, the user can set the platform properly.

The GUI/system configuration management module 7 acquires the stored data from the database management system 8, and displays it on a monitor properly (such as in a graphic manner). For example, the physical structure or logic structure of the network constituted by each device, the real time state, etc., may be displayed. The user can set or modify the system configurations according to the display on the monitor.

The open development environment module 9 provides third party programming persons with a chance for extending the function of SBP 100, so as to allow the platform of the invention to be adapted to various environments. The open development environment module 9 not only provides an API (Application Programming Interface) for accessing the necessary parts in the platform or runtime events, but also provides a management system for the third party extension. Therefore, SBP 100 of the invention is not only an application platform, but also an open development platform.

The modules shown in the dash line box in FIG. 2 are the necessary modules of the invention, which include the device management module 2, command/event management module 3, the speech processing module 4, the BLUETOOTH™ communication module 5 and connection management module 6. The other modules are optional, or may be integrated into other modules.

As described above, the invention combines BLUETOOTH™ technology with the speech processing technology. BLUETOOTH™ technology not only provides data paths between devices, but also provides synchronous audio paths. The audio paths can carry speech at a rate of 64 Kbps, and the transmission of the speech is not interrupted. This means that the speech commands given orally by the user are transmitted from the remote device 10 to SBP 100 for further processing. At the same time, the speech response of the controlled device 11 can be transmitted from platform 100 to the remote device 10, and the remote device broadcasts the speech response to the user.

Figure 3:
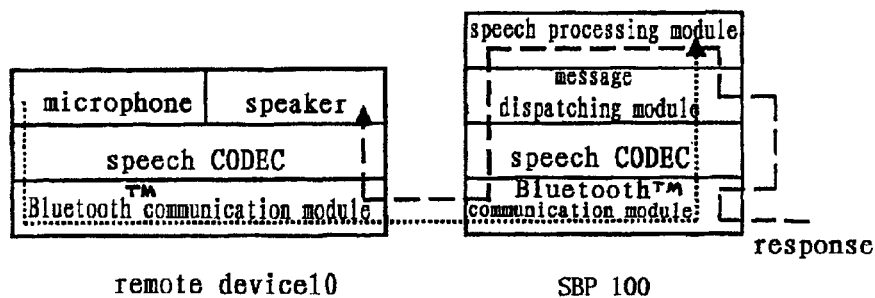
FIG. 3 illustrates a speech transmission process between a remote device and SBP.

FIG. 3 illustrates a speech transmission process between the remote device 10 and SBP 100. In FIG. 3, on the left side is the remote device 10, and on the right side is SBP 100. The remote device 10 includes an earphone, a speaker, a speech CODEC, a BLUETOOTH™ communication module, etc.; SBP 100 especially shows the speech CODEC besides the BLUETOOTH™ communication module (in FIG. 2), the message dispatching module and the speech processing module. In SBP 100, the speech CODEC may be located in the proper module according to requirements. Without losing generality, the speech CODEC may be provided in the BLUETOOTH™ communication module.

As shown by the short dash line arrow in FIG. 3, after a microphone receives a speech command given orally by a user, the speech command is encoded by the speech CODEC, and then, the speech command (after being encoded) is transmitted by the BLUETOOTH™ communication module to the BLUETOOTH™ communication module (i.e. as shown by the reference number 5 in FIG. 2) in SPB 100. After the BLUETOOTH™ communication module in SPB 100 receives the speech command transmitted by the remote device, the speech command is decoded by the speech CODEC, and then the speech command (after being decoded) is transmitted to the message dispatching module (i.e. as shown by the reference number 1 in FIG. 2). The message dispatching module dispatches the speech command to the speech processing module (i.e. as shown by the reference number 4 in FIG. 2) for further processing.

In contrast, as shown by the long dash line arrow in FIG. 3, after the BLUETOOTH™ communication module in SPB 100 receives a data response from the controlled device (i.e. as shown by the reference number 11 in FIG. 2), the data response is transferred to the message dispatching module. The message dispatching module then dispatches the data response to the speech processing module. The speech processing module makes a text-speech conversion on the data response to obtain the speech response. Then, the speech processing module transfers the speech response to the message dispatching module, which dispatches the speech response to the BLUETOOTH™ communication module. Before the speech response reaches the BLUETOOTH™ communication module, the speech response is encoded by the speech CODEC. Finally, the BLUETOOTH™ communication module dispatches the speech response (after being encoded) to the remote device 10. After a BLUETOOTH™ communication module in the remote device 10 receives the speech response from SBP 100, the speech response is decoded by the speech CODEC, and then the speaker broadcasts the speech response (after being decoded) to the user.

Figure 4:
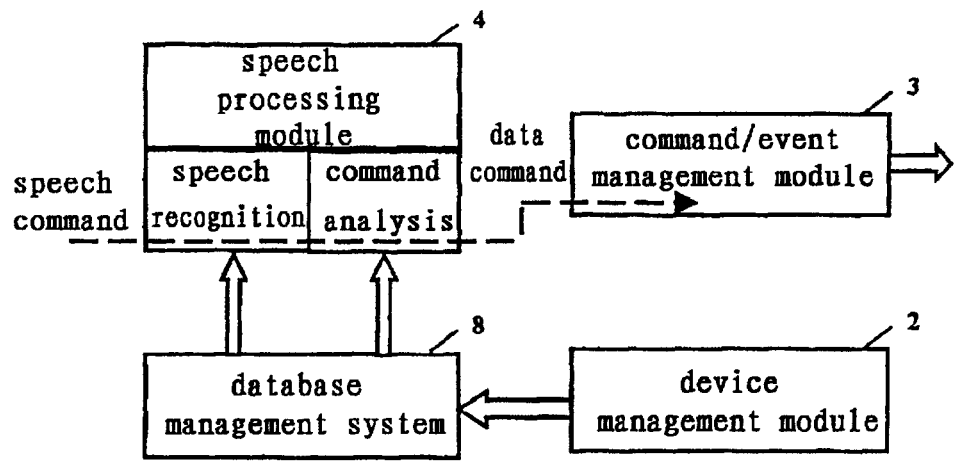
FIG. 4 illustrates a process for converting a speech command into a data command and further converting into an instruction.

FIG. 4 illustrates a process for converting a speech command into a data command and further converting it into an instruction. In FIG. 4, the speech processing module 4 includes two parts: a speech recognition part and a command analyzing part. As shown by the long dash line arrow in FIG. 4, the speech recognizing part first converts the received speech command into text, then the text is analyzed by the command analyzing part to generate a series of data commands. The operation of the speech processing part and the command analyzing part relies on the information stored and maintained in the database management system 8. For example, once the command analyzing part identifies which controlled devices these commands are sent to, it searches the database management system 8 for the necessary information related to these controlled devices (such as actions supported by these devices), for use in the following analyses.

The data commands generated by the speech processing module 4 are transferred to the command/event management module 3, which generates related instructions according to the received data commands.

Figure 5:
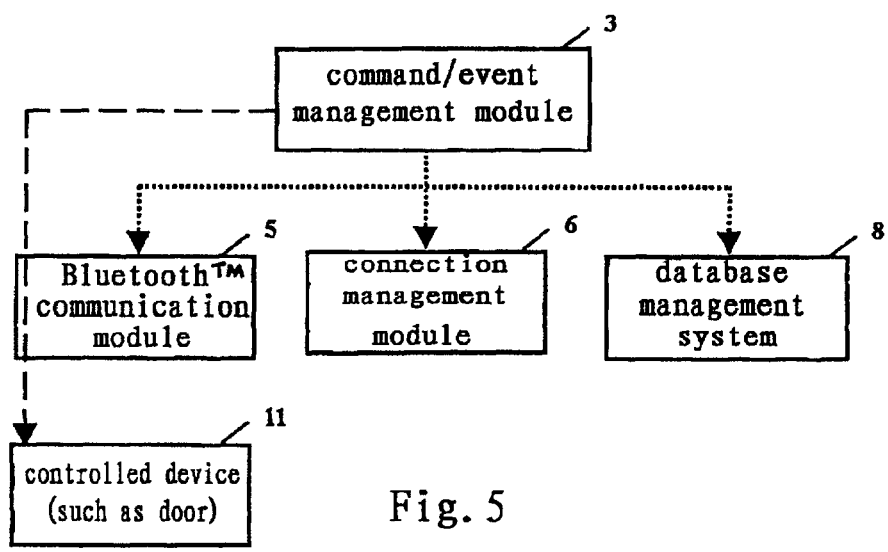
FIG. 5 illustrates a process for generating related instructions by a command/event management module.

FIG. 5 illustrates a process in which the related instructions are generated by a command/event management module according to the received data commands.

After the command/event management module 3 receives the data commands from the speech processing module 4, a series of data commands will be generated to dispatch respective parts in SBP 100 so as to realize the user's oral command.

For example, if the user's oral command is "open the door", the command/event management module generates the following commands:

(1) an instruction to the BLUETOOTH™ communication module 5: sending the corresponding instruction to the corresponding door, in such case, the sent instruction being "open the door";

(2) an instruction to the connection management module 6: establishing a BLUETOOTH™ connection between the door and SBP 100;

(3) an instruction to the database management system 8: establishing a record term; and (4) an instruction to the controlled device 11, in such case, being the instruction to "open the door".

The former three instructions correspond to the related modules in SBP 100, and are represented by a short dash line arrow in FIG. 5. The final instruction corresponds to the controlled device, and is represented by a long dash line arrow in FIG. 5.

Other embodiments are possible, for example, the remote device and the controlled device can be integrated together, and thus the user may directly issue a speech instruction to control devices without going through a particular remote device such as an earphone.

Although the preferred embodiments have been shown and described in detail, it should be realized that various changes and modifications could be made to the invention without departing from the scope of the invention.

What is claimed is:

1. A speech enabled device management and access platform, designed to interface with at least one remote control device and at least one controlled device, said platform comprising:

(a) a communication module which is configured to:
   establish connections with the remote control device and the controlled device; and
   provide data and speech paths;

(b) a connection management module which maintains network topology and provides network security administration and device access control;

(c) a device management module which discovers the controlled device and gathers respective controlled device data therefrom;

(d) a speech processing module which is configured to perform at least one of:
   converting a speech command received by said communication module into a data command corresponding to the controlled device data gathered by said device management module; and
   converting a data response from the controlled device into a speech response and providing the speech response to said communication module; and (e) a command/event management module which generates corresponding instructions based on the data command from said speech processing module and sends the generated instructions to at least one of corresponding ones of said modules and the controlled device.

2. The platform of claim 1, wherein said communication module is configured to operate using the well-known BLUETOOTH™ wireless communications standard and wherein the controlled device is located within radio frequency proximity of said platform.

3. The platform of claim 2, further comprising a database management system which stores respective controlled device data gathered by said device management module.

4. The platform of claim 2, further comprising a message dispatching module which transfers messages among said modules of said platform.

5. The platform of claim 2, further comprising a GUI/system configuration management module which provides a user with a graphical user interface for setting configuration of said platform.

6. The platform of claim 2, further comprising an open development environment module which provides a third party with an interface for extending said platform.

7. The platform of claim 2, wherein said device management module is configured to provide an interface for personalizing at least one of:
the at least one remote control device; and
the at least one controlled device.

8. A method of controlling a controlled device using speech with a remote control device via a device management and access platform, said method comprising the steps of:
(a) establishing a first piconet including the device management and access platform and the remote control device, wherein the remote control device is configured as a master device in the first piconet and a second piconet including the device management and access platform and the controlled device, wherein the device management and access platform is configured as a master device in the second piconet;
(b) receiving a speech command from said remote control device via the first piconet;
(c) converting the received speech command into a data command for the controlled device;
(d) generating corresponding instructions based on the data command; and
(e) sending the generated instructions to the controlled device.

9. The method of claim 8, wherein step (a) comprises establishing an RF connection in accordance with the well-known BLUETOOTH™ wireless communications standard.

10. The method of claim 9, further comprising the additional steps of:
generating a data response from said controlled device;
converting the data response from said controlled device into a speech response; and
sending the speech response to said remote control device.

11. The method of claim 9, further comprising discovering the controlled device by the device management and access platform.

12. The speech enabled device management and access platform of claim 1, further comprising:
a first piconet including the device management and access platform and the remote control device, wherein the remote control device is configured as a master device in the first piconet; and
a second piconet including the device management and access platform and the controlled device, wherein the device management and access platform is configured as a master device in the second piconet.

13. A system for managing and controlling wireless devices using speech, the system comprising:
a device management and access platform configured to receive and transmit communications from and to other devices in the system;
at least one remote device configured to receive speech commands and transmit the speech commands to the device management and access platform;
at least one controlled device configured to receive data commands from the device management and access platform, execute predetermined actions, and return corresponding responses to the device management and access platform;
a first piconet including the device management and access platform and the remote device, wherein the remote device is configured as a master device in the first piconet; and
a second piconet including the device management and access platform and the controlled device, wherein the device management and access platform is configured as a master device in the second piconet.

14. The system of claim 13, wherein the first piconet and the second piconet constitute a scatternet through the device management and access platform.

15. The system of claim 13, wherein the device management and access platform comprises a device management module configured to discover the controlled device and gather respective controlled device data therefrom.

* * * * *